(12) United States Patent
Herloski et al.

(10) Patent No.: US 7,755,811 B2
(45) Date of Patent: *Jul. 13, 2010

(54) DOCUMENT ILLUMINATOR

(75) Inventors: Robert P. Herloski, Webster, NY (US); Douglas E. Proctor, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1413 days.

This patent is subject to a terminal disclaimer.

(21) Appl. No.: 11/169,717

(22) Filed: Jun. 30, 2005

(65) Prior Publication Data

US 2007/0002567 A1    Jan. 4, 2007

(51) Int. Cl.
*H04N 1/04* (2006.01)

(52) U.S. Cl. .................. 358/475; 358/474; 358/479; 358/484

(58) Field of Classification Search .......... 358/475, 358/474, 479, 484; 362/555; 250/216, 234
See application file for complete search history.

(56) References Cited

U.S. PATENT DOCUMENTS

| | | | |
|---|---|---|---|
| 5,453,849 A * | 9/1995 | Copenhaver et al. ........ | 358/475 |
| 5,841,596 A | 11/1998 | Perlo et al. | |
| 6,017,130 A | 1/2000 | Saito et al. | |
| 6,236,470 B1 | 5/2001 | Seachman | |
| 6,299,328 B1 * | 10/2001 | Wilson ................. | 362/223 |
| 6,464,366 B1 | 10/2002 | Lin et al. | |
| 6,598,998 B2 | 7/2003 | West et al. | |
| 6,661,497 B2 * | 12/2003 | Tabata et al. ............ | 355/69 |
| 2001/0019487 A1 | 9/2001 | Honguh et al. | |
| 2002/0054387 A1 | 5/2002 | Yokota et al. | |
| 2002/0097578 A1 | 7/2002 | Greiner | |
| 2004/0042194 A1 | 3/2004 | Hsieh | |
| 2006/0067640 A1 | 3/2006 | Hsieh et al. | |

FOREIGN PATENT DOCUMENTS

WO    WO 98/26212 A    6/1998

OTHER PUBLICATIONS

U.S. Appl. No. 10/995,462, filed Nov. 23, 2004.
U.S. Appl. No. 11/094,965, filed Mar. 31, 2005.

* cited by examiner

*Primary Examiner*—Houshang Safaipour
(74) *Attorney, Agent, or Firm*—Oliff & Berridge, PLC

(57) ABSTRACT

A document illuminator includes a light-transmissive element having an embedded source of illumination fitted in a cavity formed therein. The light-transmissive element preferably has one or more optical notches and preferably is encased in an opaque surround to promote total internal reflection of the light rays emanating from the LED. The one or more optical notches may include a dual-V notch or an elliptical notch. The reflected light rays are collected at an aperture which in turn transmit light at high power and highly uniform illumination profile to illuminate a document.

29 Claims, 10 Drawing Sheets

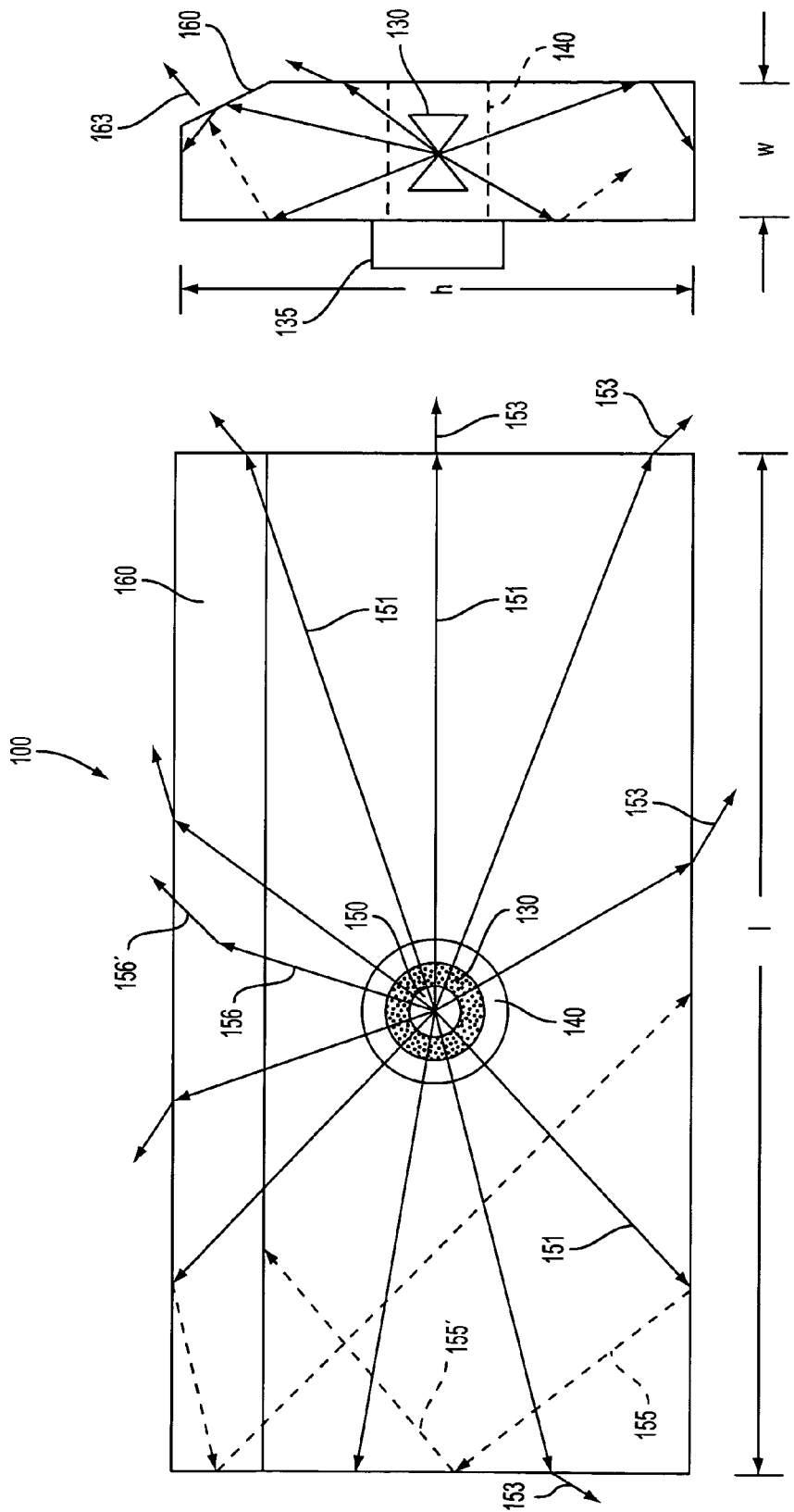

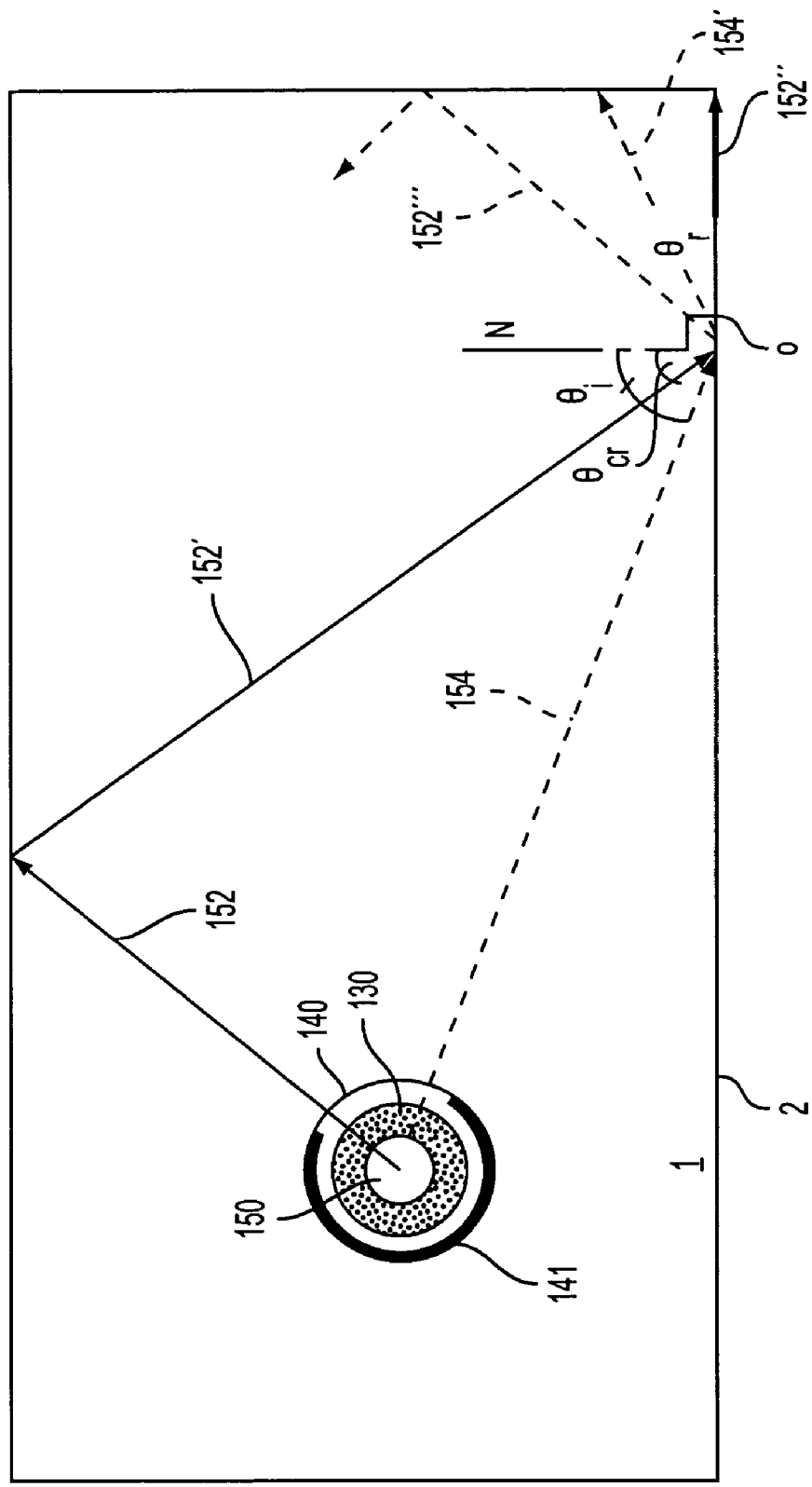

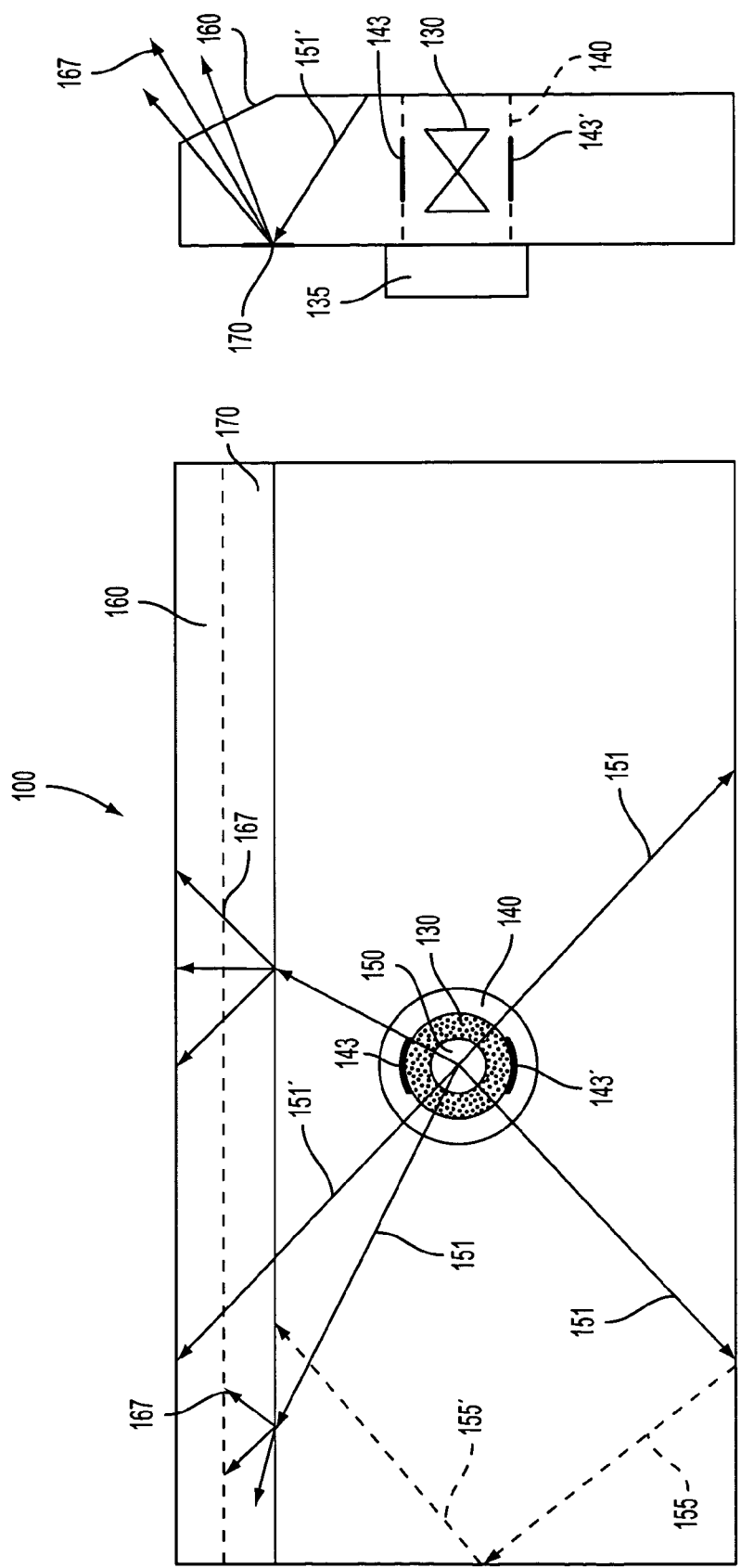

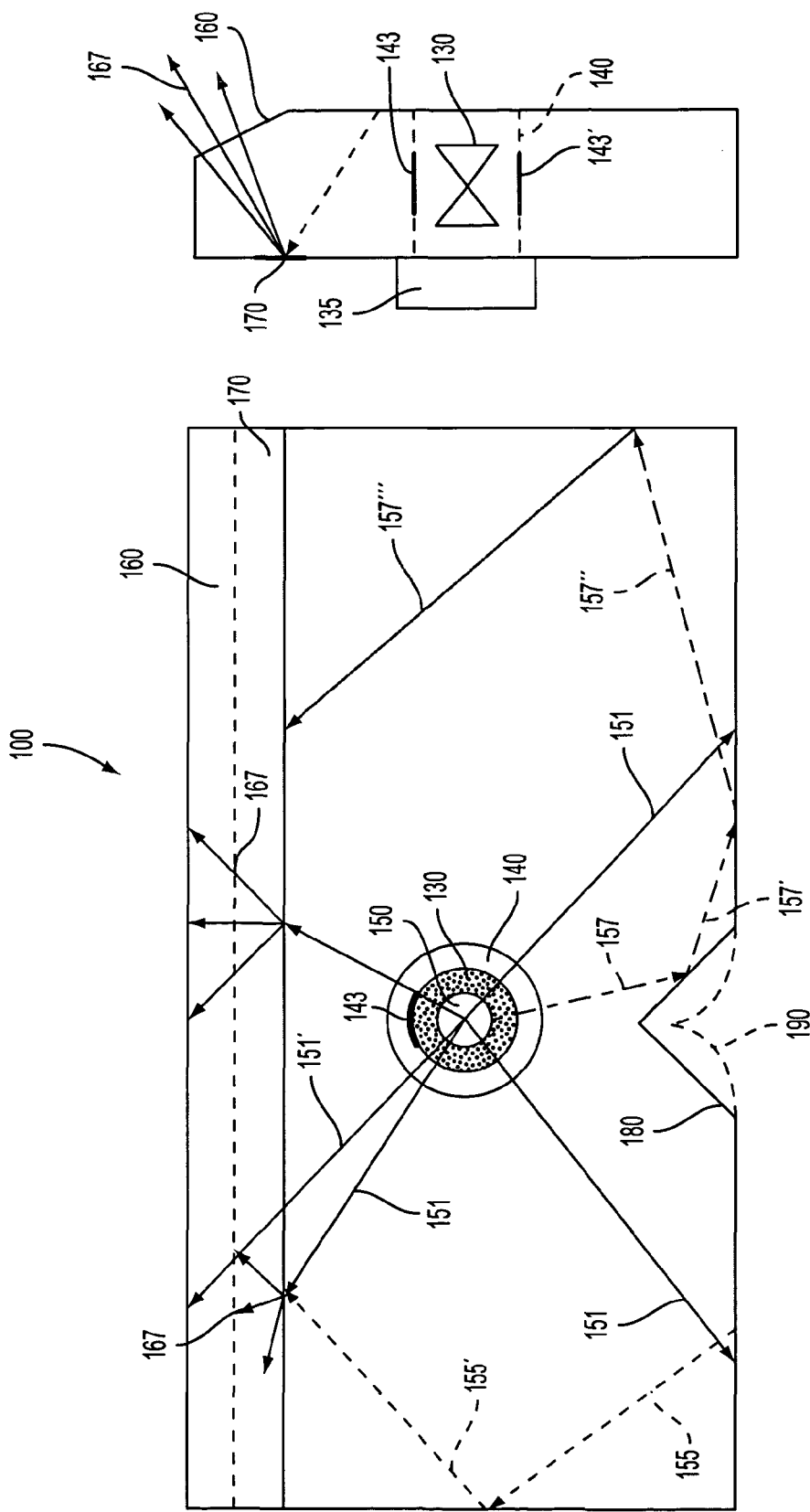

DOCUMENT ILLUMINATOR

Cross-reference is made to co-pending, commonly assigned U.S. application Ser. No. 10/995,462, entitled "Document Illuminator," filed on Nov. 23, 2004, and to co-pending, commonly assigned U.S. application Ser. No. 11/094,965, entitled "Compound Curved Concentrator Based Illuminator," filed on Mar. 31, 2005, each of which is herein incorporated by reference in its entirety.

BACKGROUND

Document illumination systems or devices which are used for illuminating documents for scanning typically include an illumination source, such as a tungsten lamp or fluorescent lamp, and an opposing reflector. The illumination source is normally located on one side of an optical center line of the scanner under a platen or constant velocity transport (CVT) system while the reflector is positioned on the opposite side of the optical center line of the scanner under the platen or CVT system. The illumination source, in conjunction with the opposing reflector, provides illumination of the document or object being scanned by the scanner.

FIG. 1 illustrates the components of a document illumination system which may, for example, be used as a stand alone scanner or in a copier. As described in U.S. Pat. No. 6,236,470, the system may be employed in either a light lens scanning system or a digital scanning system (including a platen or CVT, for example) in order to illuminate a document for reproduction, display, and/or storage in an electronic memory, magnetic medium, or optical disk. The illumination system of FIG. 1 includes a platen 20 upon which a document 10 rests. The document 10 may be dispensed onto the platen by a document handler 25. Document 10 is illuminated by a light source 50. The light source 50 is typically a linear fluorescent lamp (with or without aperture reflecting coatings 60 on the interior lamp surface to form an aperture 65), or a linear tungsten lamp. The light source 50 is situated on one side of an optical center line 40. An imaging system (not shown) causes an image of the portion of the document immediately surrounding this optical center line 40 to be projected onto a light sensing device such as a charge coupled device (CCD). It is known in the art that if the image is directed to a CCD sensor or a full width array sensor, the light reflected from the document about the optical center line 40 is converted into electronic signals forming image data that electronically represent the document, and the data may be stored on a recording device such as a computer memory.

On the opposite side of the optical center line 40, an opposing reflector 30 is situated. The opposing reflector 30 provides indirect illumination to the document being scanned by redirecting light which would normally not illuminate the document (light leaving the light source in a parallel or substantially parallel path with respect to the platen 20) back to the document. Reflector 30 reflects nondirect light 57 back to the document 10, as reflected light 35, at an angle substantially opposite to the angle of light 55 being emitted directly toward the document 10 by the light source 50. This reflection suppresses shadowing on documents with nonplanar features.

SUMMARY

Although conventional illumination systems provide adequate illumination for a scanner, various problems are associated with conventional illumination systems. One such problem is the size of the lamp/reflector combination, in which space can be premium. Another problem is the repair and maintenance of these relatively large illumination systems.

Further, a vast majority of document illuminators in digital input scanners use linear fluorescent lamps, including cold-cathode fluorescent lamps (CCFLs), which use small diameter (~2 mm) mercury (Hg) fluorescent lamps. For high speed, high performance scanners, larger-diameter (e.g., 8-10 mm) xenon (Xe) linear fluorescent lamps are used in preference over larger-diameter Hg linear fluorescent lamps. However, due to high voltage requirements of both Xe and Hg lamps, and thermal sensitivity of the Hg lamps, as well as the desire to reduce mercury content in products, it is desirable to explore other light producing technologies such as light emitting diodes (LEDs) which may perform at high performance levels with fewer mechanical problems, less input energy, high efficiency and less maintenance and cost. A side light emitting device is described by Robert S. West in U.S. Pat. No. 6,598,998. A different type of point-shaped light source is shown in U.S. Patent Application Publication US 2002/0097578 A1 by Horst Greiner. A line illumination device is taught in U.S. Pat. No. 6,017,130 to Tomihisa Saito, et al.

Embodiments according to the present disclosure incorporate a small light source in an illuminator, such as a light-transmissive element (LTE), to provide a compact document illuminator.

A device may include a light-transmissive element (LTE), wherein the LTE has an elliptical notch or a notch formed of a plurality of V-shaped notches; a cavity formed in the LTE; a light-emitting diode (LED) positioned inside the cavity; an aperture formed in the LTE positioned to receive light emitted from the LED, wherein the light traverses the aperture to illuminate a document; an aperture; an LED embedded within the LTE wherein light emitted from the LED is internally reflected to the aperture, to illuminate a document; a lens adapted to receive a reflected image of the document and to focus the reflected image on to an array of sensors to convert the images to electronic signals; and a memory storage device to record the electronic signals as digital data.

These and other features and details are described in, or are apparent from, the following detailed description.

BRIEF DESCRIPTION OF THE DRAWINGS

Various exemplary embodiments are described with reference to the following figures, in which like numerals represent like parts, and in which:

FIGS. 3 and 4 are front and side view drawings, respectively, of an embodiment having a light-transmissive element fitted with an LED in a cavity formed therein;

FIG. 5 is a drawing of the placement of an LED in a different position in the light-transmissive element of FIGS. 3a and 3b showing how total internal reflection (TIR) of a light ray may be obtained by positioning the LED in a manner such that a angle of incidence $\theta_i$ of the light ray is greater than the critical angle $\theta_{cr}$;

FIGS. 6 and 7 are front and side view drawings, respectively; of another embodiment showing the use of opaque reflective linings on the cavity wall and diffusive scatterers on the rear wall of an aperture;

FIGS. 8 and 9 are front and side view drawings, respectively, of still another embodiment showing the use of an optical V-notch to obtain TIR;

DETAILED DESCRIPTION OF EMBODIMENTS

In embodiments there is illustrated: a device for scanning a document using an LED along with a linear light-transmissive element to illuminate the document.

Figure 1:
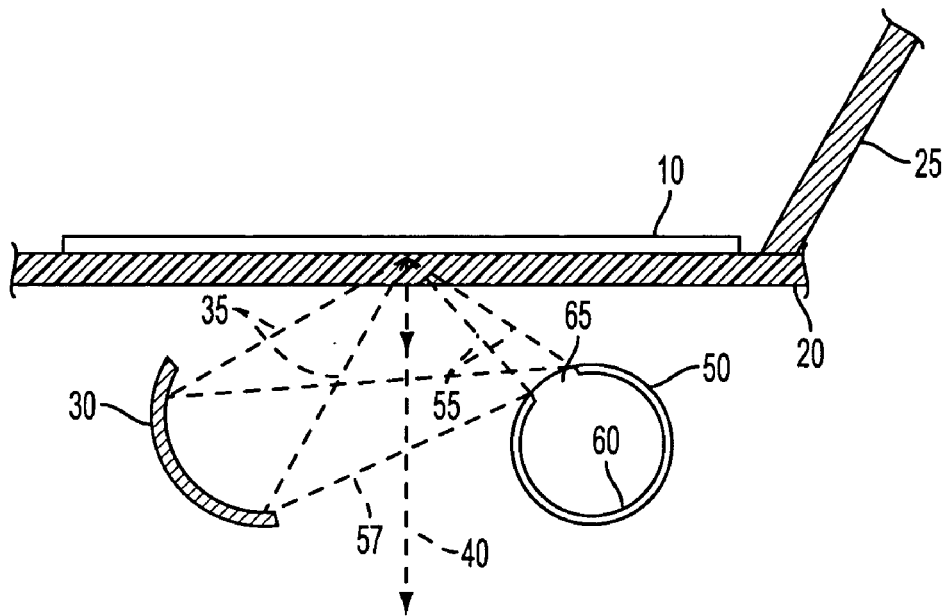
FIG. 1 is a drawing of a conventional document illumination system showing the relationship of a lamp and a reflector with respect to a document to be scanned.
Figure 2:
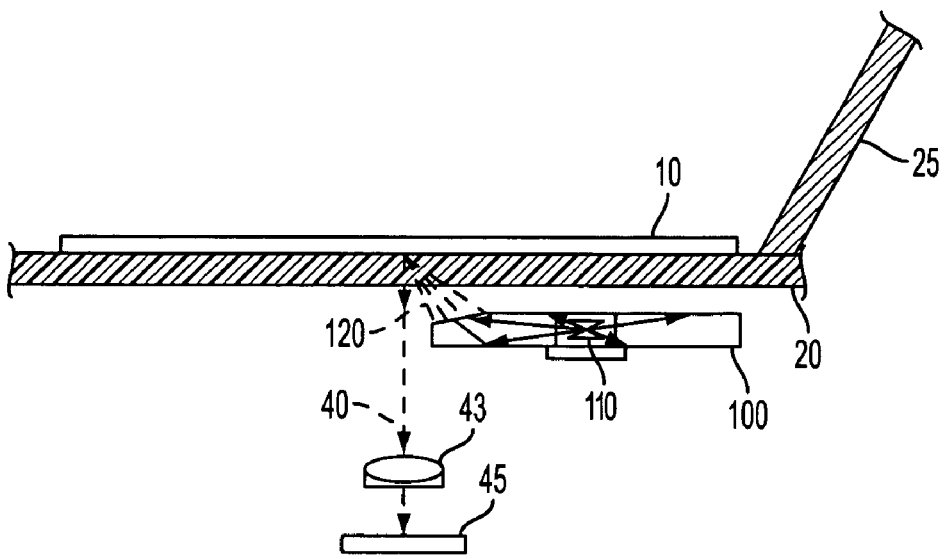
FIG. 2 is a drawing of an embodiment showing the replacement of the lamp and the reflector of the document illumination system of FIG. 1 with a light-transmissive element (LTE)

FIG. 2 shows a light-transmissive element (LTE) including a light guide 100 interacting with a platen 20 and a document 10. The light guide 100 includes a light source region 110, which emits light out of the light guide 100 as rays 120 to illuminate the document 10 on the platen 20. An imaging system 43, which may include a lens, causes an image of the portion of the document immediately surrounding this optical center line 40 to be projected onto a light sensing device 45. The light sensing device 45 may, for example, include a linear array of photo-sensors (full width array sensor), a CCD sensor, or a photoreceptor. The light reflected from the document about the optical center line 40 is converted by the light sensing device 45 into electronic signals that form image data electronically representing the document. The data may be stored on a recording device such as a memory in a computer. Although a platen 20 is illustrated and discussed in the example shown in FIG. 2, any document delivery system may be used in place of the platen 20. For example, a constant velocity transport (CVT) system may be used in place of the platen 20 in FIG. 2.

FIGS. 3 and 4 show a front view and a side view, respectively, of an embodiment of the light guide 100. The light guide 100 may be capable of illuminating a full or partial page width of documents, such as letter size, legal size, A3 size, A4 sizes, or any other desired size of document, and can be applicable to 36-inch, as well as 6-inch illuminators. Thus, the length l shown in FIG. 3 may be as long as 320 mm or more. The width w may vary from about 2 mm to about 6 mm, while the height h may vary from about 20 mm to about 25 mm, although these dimensions are not limited to these ranges. An LED 130 which may be a side-emitting LED or any other appropriate type of LED, is fitted inside a cavity 140 formed in the light guide 100. Light emanating from a light source 150 inside the LED is coupled into the light guide through the walls of the cavity. A chamfered aperture 160 may be formed in the light guide to receive light either directly or reflectively from the LED, as explained in more detail below, and redirect it to illuminate a document (not shown) adjacent the aperture 160. Although the above discussed uses an exemplary configuration having a chamfered aperture, a specific orientation of light scattering surface and/or a specific location of a light scatterer, other configurations may be used. For example, as disclosed in co-pending application Ser. No. 11/094,965, a lightguide having dielectric compound parabolic concentrator (DCPC) may be used. The configuration of the DCPC-based lightguide does not have a chamfered aperture, and the orientation of the light scattering surfaces is significantly different from the exemplary example discussed above.

The light guide 100 may be made of a clear acrylic material, although other materials may also be used. The cavity 140 is shown located centrally within the light guide; however, it will be understood that non-central positions in the light guide may also be used. The cavity may be a through-hole that goes through the width w of the light guide shown in FIG. 4, or a blind hole that does not span the whole width, depending upon the manner in which it is desired to guide the light into and out of the light guide 100. LED 130 may be held inside the cavity in a number of ways, including mounting the LED on a circuit board, which in turn forms a shoulder support 135 for the LED against the sidewall of the light guide 100, as shown in FIGS. 3 and 4. The circuit board may be a component of an electronic system (not shown) for controlling the light source 150 of the LED 130. Walls of the cavity 140 may be polished to aid in the transmission of light from the LED 130 to other parts of the light guide 100.

In general, light rays 151 (shown in solid arrows) emitted by the LED 130 will emanate radially in all directions from cavity 140, some refracting and escaping into the surrounding environment as rays 153, some others reflecting back into the guide as rays 155 (shown in dashed arrows), and bouncing back and forth before leaving the guide altogether. A ray 155 may undergo retroreflection such that ray 155' is reflected parallel to the original ray 151. Some rays will travel directly into the region of the aperture 160 and project onto the surrounding area, including the document to be illuminated, as rays 163. A ray 156 striking the chamfered surface of aperture 160 may refract into the surrounding environment medium as rays 156' as shown in FIG. 3.

It is known that when light travels from a first medium to a second medium, it typically does not continue traveling in a straight line, but, as it crosses the boundary between the adjacent media, refracts or bends at an angle away from or towards a normal line drawn to the surface of the boundary between the first and second media. The angle that the incident ray in the first medium makes with the normal line is referred to as the angle of incidence $\theta_{i1}$, and the angle which the transmitted ray in the second medium makes with the normal line is referred to as the angle of refraction, $\theta_{r2}$. The relationship between the two angles depends upon the refractive index, $\eta$, of each of the two media, and is governed by the well-known Snell's law: $\sin \theta_{i1}/\sin \theta_{r2} = \eta_{r2}/\eta_{i1}$ where the subscripts denote the type of angle (incident, i, or refractive, r) of its respective medium (1st or 2nd). Light travels faster in a less dense (lower refractive index) material. The minimum possible refractive index is 1.0000, in a vacuum. Thus, it can be shown that if a ray of light passes across the boundary from a material in which it travels slower into a material in which it travels faster, then the light ray will bend away from the normal line, and vice versa. It can also be shown that there is an incident angle, called the critical angle, $\theta_{cr}$, at which the transmitted ray can be refracted at 90° to the normal, that is, parallel to the boundary surface. For any light ray in the first (denser) medium having an incident angle greater than $\theta_{cr}$, none of the light ray will escape from the first (denser) medium into the second (less dense) medium, thus yielding total reflection from the boundary back into the first medium, without any transmission of refracted light into the second medium. This phenomenon which occurs at $\theta_{cr}$ is known as total internal reflection (TIR).

As an example, the critical angle $\theta_{cr}$ for a ray from a light source in transparent acrylic entering into surrounding air medium, such as shown in FIG. 5, is from about 36.0° to about 45.6° with $\eta_{acrylic}$ from about 1.4 to about 1.7 and $\eta_{air}$=1.0003. It will be noted that TIR only occurs for light traveling from a first medium having a higher refractive index than the medium it is entering. Furthermore, the angle of refraction, $\theta_r$, varies from 0 to 90°, and with total internal reflection, no light power is lost in the reflection. FIG. 5 illustrates the angle of incidence $\theta_i$ of a light ray in general, and critical angle $\theta_{cr}$ at which the angle of refraction $\theta_r$ can be made 90° from the normal plane N in order to achieve TIR. Light ray 152' arriving at intersection O formed by normal plane N and the boundary plane between medium 1 and medium 2 at critical angle $\theta_{cr}$ will have a refracted component at 152" refracted at 90° and a reflected component 152'". The refracted component 152" remains parallel to the boundary plane and within medium 1, but has no net conducted power. Any other light ray 154 that forms an incident angle $\theta_i > \theta_{cr}$ will then experience total internal reflection in the direction shown by ray 154'. In embodiments, cavity 140 may be placed at different places within medium 1 in order to maximize light power and profile. The wall of the cavity 140 may be partially lined with an opaque lining 141 in order to establish the desired angle of incidence.

In embodiments, the light guide 100 may contain an LED. For example, the light guide 100 may have an embedded LED. This may be provided by forming the cavity 140 with different cross-sections extending in the length l and height h directions of the light guide 100. The different cross-sections may include, but are not limited to, circle, square, rectangle and polygon. Certain portions of the cavity may also be lined with an opaque reflective lining or light blockers 143 and 143' as shown in FIGS. 6 and 7 in order to allow light rays 151 to directly emanate from light source 150 in LED 140 in a manner that yields total internal reflection rays 155 from the walls of the light guide. Rays that would not have the proper angle of incidence, and therefore not go through a total internal reflection, are blocked by the light blockers 143 and 143'. TIR rays are received at the chamfered aperture 160 for further transmission to illuminate a document (not shown).

Figures 10, 11:
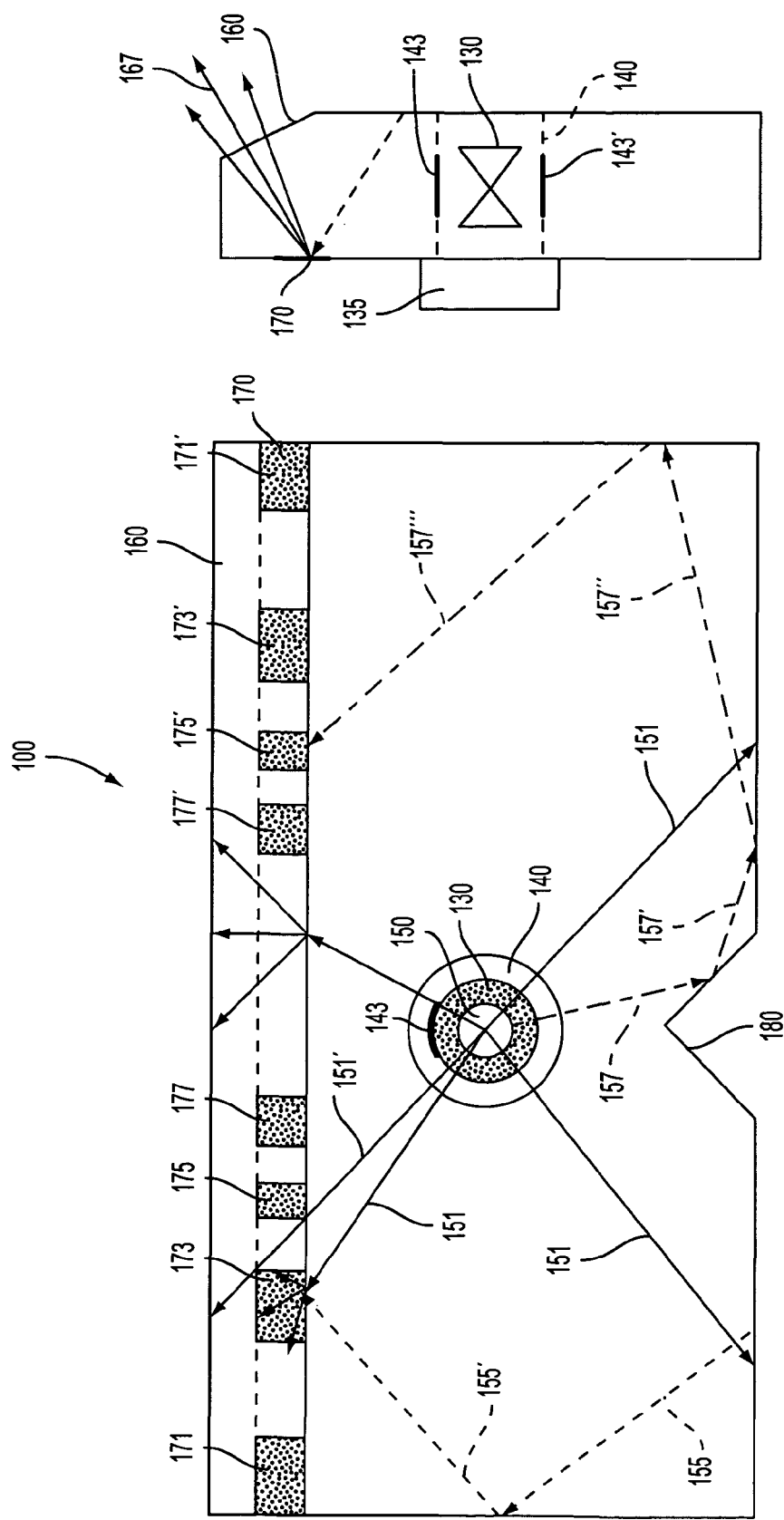
FIGS. 10 and 11 are front and side view drawings, respectively, of yet another embodiment showing the use of graduated light scatterers to encourage light rays to collect at the apertures of FIGS. 6 and 7 in order to illuminate a document with maximum power and uniform illumination profile.

In embodiments, direct rays 151' and/or reflected light rays 155 that collect at aperture 160 are further diffused as rays 167 to enhance illumination power and illumination profile by providing additional opaque diffusively reflecting lining 170 at the rear wall of aperture 160, as shown in FIGS. 6 and 7. The opaque specular linings 143, 143' that are formed on the cavity walls and/or the diffusively reflecting scatterer 170 that is formed on the aperture wall may be continuous or discontinuous, and of any shape including, but not limited to, square, rectangle, triangle, polygon, and stretched versions of these and other shapes. As shown in FIGS. 10 and 11 below, the scatterer 170 may be a collection of differently shaped and positioned scatters 171, 173, 175, 177, . . . that are designed to produce relatively uniform illumination at the document 10. For example, rays are generated by the LED source 130. The rays exit the LED source 150, exit the LED 130, then enter the lightguide. The rays then bounce back and forth (TIR) within the lightguide until they either (a) exit/refract from the aperture 160, (b) exit/refract from other parts of the lightguide—in that case they are redirected back into the lightguide by the white diffusing surround, as discussed in greater detail below in connection with FIGS. 12 and 13, or (c) hit the scatterers 170 (171, 173, 175, . . . ). The scatterers then act as a secondary source of rays, which again traverse the lightguide and exit according to (a), (b), or (c).

The intensity and shape of the illumination emerging from aperture 160 is governed by how well the light emitted from the LED is directed to the aperture. As shown above, light emanating from a light source in a cavity such as shown in FIGS. 3 and 4 will project in all directions and only a portion of the light will emerge from the chamfered aperture 160 with a generally scattered shape and weak power due to the remaining portions of the light escaping (153) from all surfaces of the light-guide. On the other hand, through a judicious placement of light blockers 143 and 143', such as opaque reflective linings, the light emanating from LED 130 may be directed in a manner that encourages the light to enter the lightguide and reflect from the acrylic-air boundary surfaces of the light guide towards the aperture 160, and be further strengthened by providing diffused scattering from additional diffusively reflecting scatterer 170 at the aperture, thereby yielding light rays leaving the aperture at an output strength and profile higher than that with the light guide of FIGS. 3 and 4. The opaque blockers 143 and 143' shown in FIGS. 6 and 7 form sectors subtending approximately 60 degrees along the cavity wall, and other sectors of different angles and angles may be used to fine tune the characteristics of the light rays emanating from the LED for enhanced TIR. The opaque linings both at the cavity and at the aperture preferably have a reflectivity of approximately 90% or more so that the light emanating from the LED is transmitted to the scanned document at a relatively high strength and uniform illumination profile in the directions shown by arrows 167.

An alternative embodiment involves an optical V-notch 180 that is formed at the lower edge of the light guide 100 as shown in FIG. 8. The notch provides an inclined surface different from the flat bottom surface of the light guide such that a ray that would have otherwise escaped to the surrounding medium is thereby reflected inward inside the light guide, eventually diffusing out at the aperture, thus adding more power to the resultant illumination issuing from the light guide. Thus, the notch enhances TIR as shown by rays 157, 157', 157" and 157'" in FIG. 8.

The embodiment shown in FIG. 8 may be further enhanced by providing a notch with a curve 190 (shown in phantom) in place of the V-notch shown in FIG. 8. The curve 190 may be a simple curve or a compound curve. A compound curve, as defined in this disclosure, is a curve that continuously changes its curvature, or a curve that is made of a plurality of curves having different curvatures. The curve 190 may be calculated to provide even more enhanced total internal reflection of light rays incident on the curve. The calculation takes into account the overall dimensions of the light guide and the placement of the LED within the light guide.

In embodiments as shown in FIGS. 10 and 11, the rear surface of light guide 100 may be patterned with a series of diffusively reflecting patches (171, 173, 175, 177, and 171', 173', 175', 177'), preferably white patches, that frustrate TIR and cause the internally reflected light to scatter and subsequently exit the light guide through the chamfered aperture 160 with minimal power loss and maximal uniform illumination profile. In one aspect, the size and position of the patches can be varied to customize the shape of the illumination at the aperture. In another aspect, by making the diffusely reflecting white patches graduated, that is, smaller near the light source and progressively larger in length further away, the variability of the illumination profile from one end to another can be minimized. This results in a uniform profile with sufficient output power level along the whole length of the aperture 160. The aperture 160 itself may be molded in various configurations to shape the illumination profile and enhance exposure efficiency. Additionally or alternatively, the scatterers may have groove features. For example, the scatterers may have one or more grooves.

Figures 12, 13:
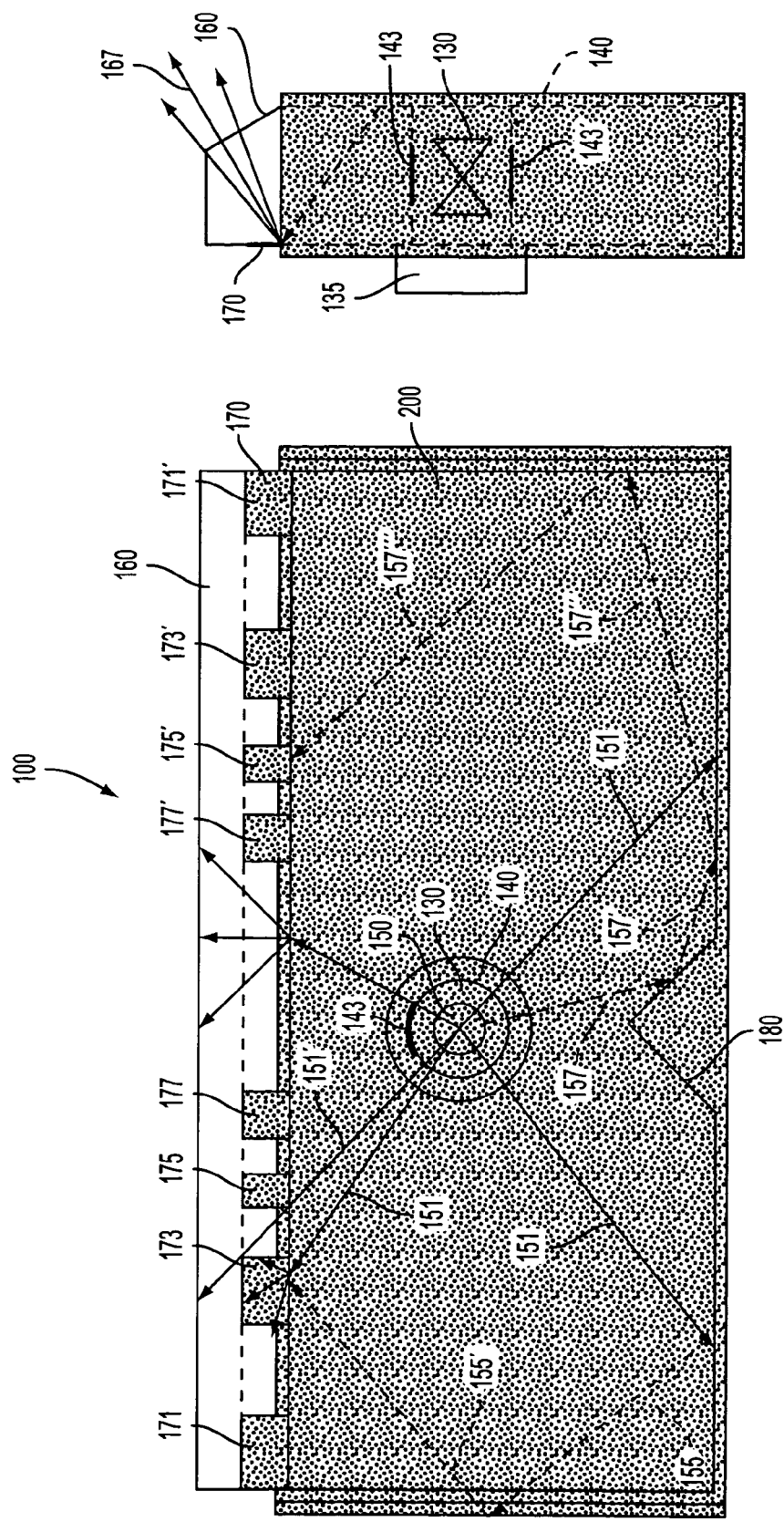
FIGS. 12 and 13 are front and side view drawings, respectively, of an embodiment having a disclosed light-transmissive element encased in white surround to capture any light that may escape from any of the surfaces of the light-transmissive element, and thereby increase the light power output and improve the illumination profile used to illuminate a document.

In an alternative embodiment shown in FIGS. 12 and 13, the entire light guide 100 may be encased in an opaque surround 200 with a reflectivity of from about, but not limited to, 60% to about 90%. The surround 200 may be made of white plastic, for example, and has the effect of reflecting light rays that may have exited the light guide 100 back into the light guide 100, thus enhancing efficiency.

Figure 14:
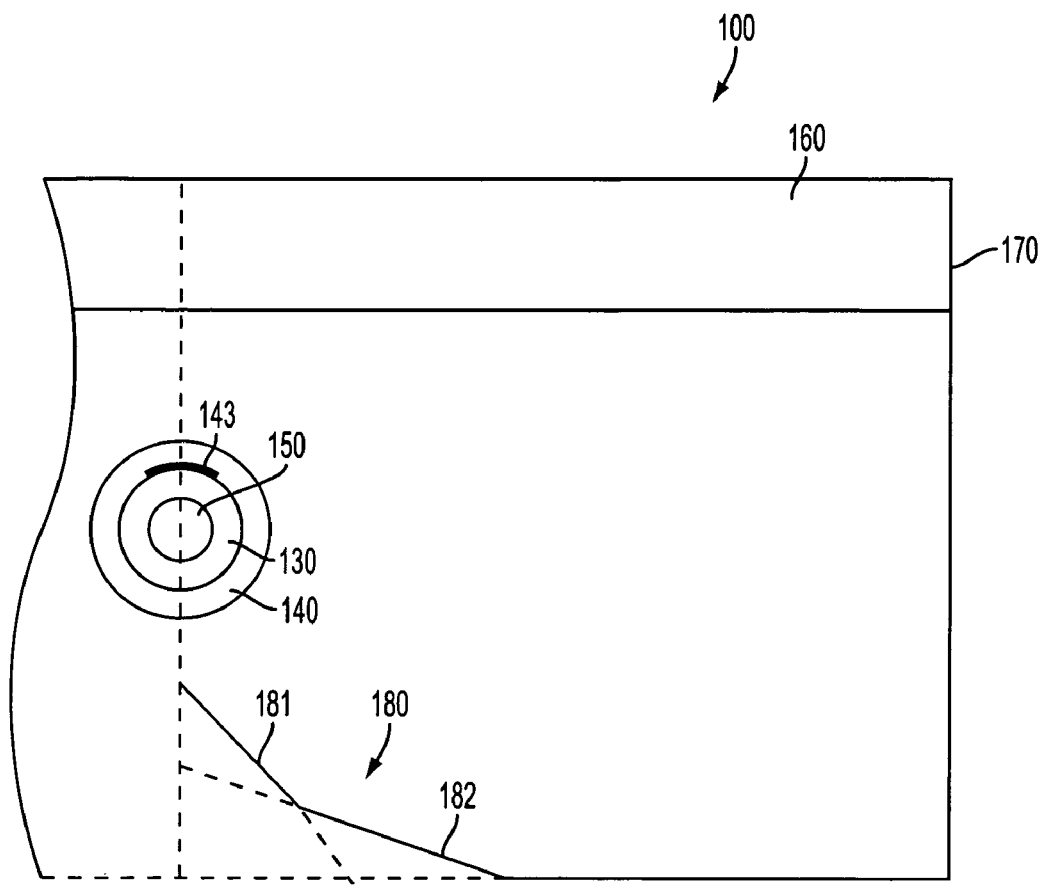
FIG. 14 illustrates an embodiment having a dual-V shaped notch.

FIG. 14 illustrates an embodiment having a notch 180 that includes a dual-V shaped optical notch. The dual-V shaped notch includes a first V-notch 181 and a second V-notch 182. As shown in FIG. 14, optical notches 181 and 182 have surfaces of different inclination with respect to the bottom surface of the light guide 100. The degree of inclination of each of the optical notches 181 and 182 may be adjusted based on the overall configuration of the light guide 100 to enhance total internal reflection.

In FIG. 14, only the right-hand side half of the dual-V notch 181, 182 is shown. The left-hand side half of the notch may be symmetrical or asymmetrical to the right-hand side half, depending on the overall configuration of the light guide 100, including the location of the LED 130 within the light guide 100, to enhance internal total reflection.

Figure 15:
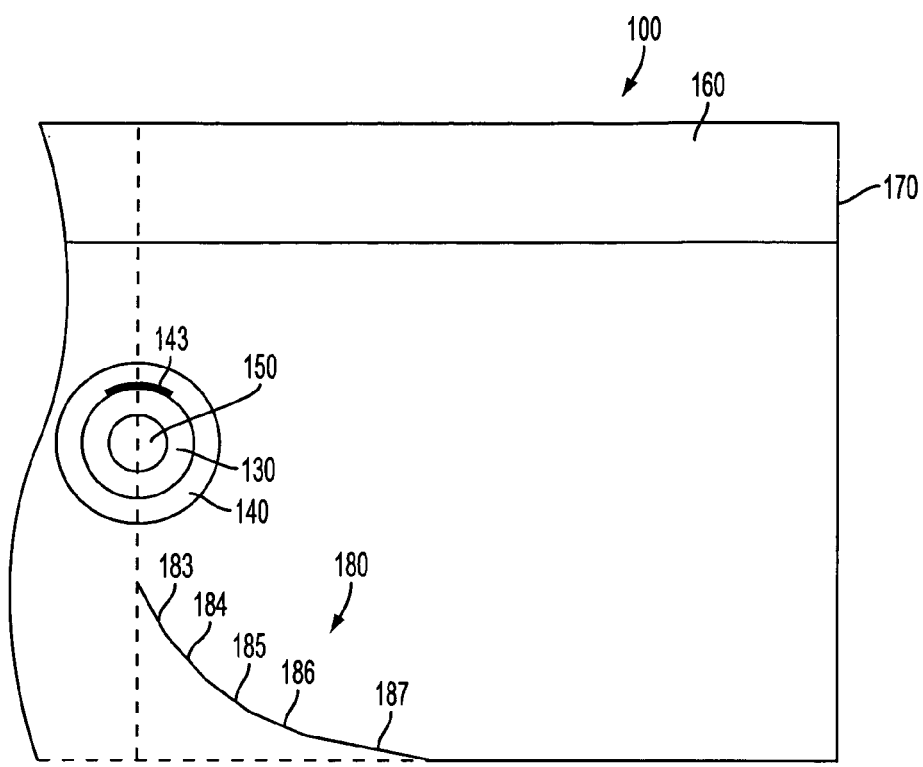
FIG. 15 illustrates an embodiment having a notch made of a series of V-shaped notches.

FIG. 15 illustrates another embodiment having a notch that is made of a series of V-shaped notches. As shown in FIG. 15, the optical V-notch 180 of FIG. 8 includes V-notches 183, 184, 185, 186 and 187. The inclination surfaces of V-notches 183-187 are of successively increasing angles with respect to the bottom surface of the light guide 100. The inclination of the surface of each of the V-notches 183-187 may be adjusted according to the overall configuration of the light guide 100 to enhance total internal reflection. The left-hand side half (not shown) may be symmetrical or asymmetrical to the right-hand side half, shown in FIG. 10, of the V-notches 183-187.

Although five V-notches 183-187 are shown in FIG. 15, fewer or more V-notches may be used according to the overall configuration of the light guide 100 to enhance total internal reflection.

Figure 16:
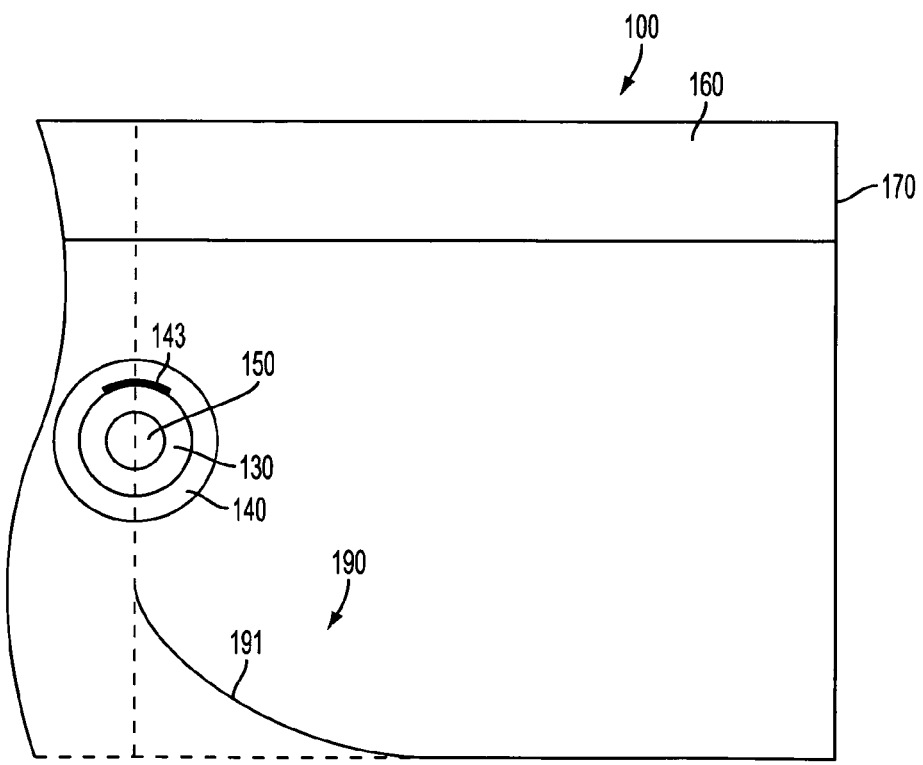
FIG. 16 illustrates an embodiment having a curved notch.

FIG. 16 illustrates an embodiment having an elliptical notch 191 with an elliptical curve. The curvature of the elliptical notch 191 may be adjusted according to the overall configuration of the light guide 100 to enhance total internal reflection. Also, the left-hand side half (not shown) of the notch 191 may be symmetrical or asymmetrical to the right-hand side half (shown in FIG. 16) of the notch. Although an elliptical curve is illustrated and discussed in the example shown in FIG. 16, the notch may also have a curve that is other than an elliptical curve.

Figure 17:
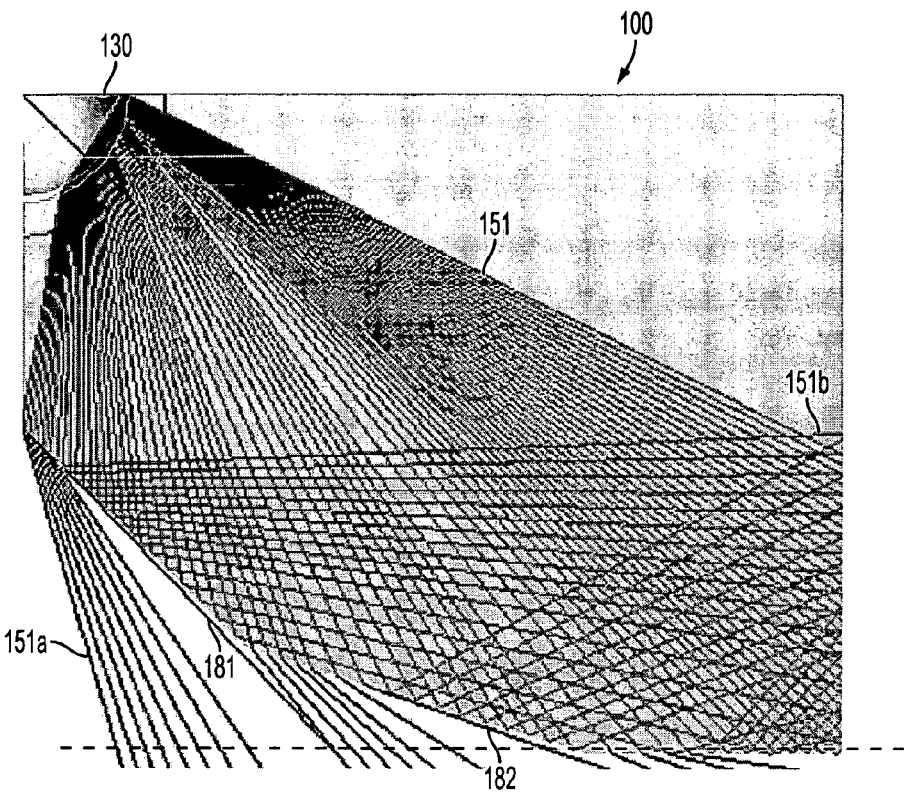
FIG. 17 illustrates optical paths of light rays affected by the dual-V shaped notch in FIG. 14.

FIG. 17 illustrates optical paths of light rays 151 within the light guide 100 having the dual-V notch 181, 182 of FIG. 14. As shown in FIG. 17, the dual-V notch 181, 182 increases the amount of internally reflected light rays 151b, and reduces the amount of escaped light rays 151a. When properly configured, the dual-V notch 181, 182 of FIG. 12 may provide enhanced total internal reflection compared to the single-V notch 180 shown in FIG. 8.

Figure 18:
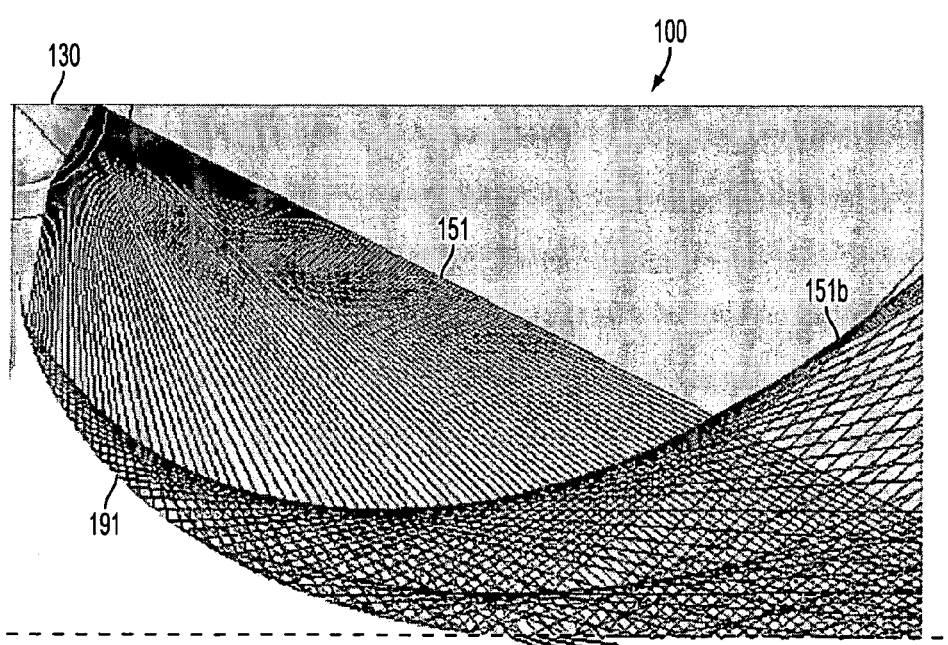
FIG. 18 illustrates optical paths of light rays affected by the elliptical notch shown in FIG. 16.

FIG. 18 illustrates optical paths of light rays 151 in a light guide 100 having the elliptical notch 191 of FIG. 16. As shown in FIG. 18, the elliptical notch 191 increases the number of internally reflected light rays 151b, and reduces the number of escaped light rays 151a. When properly configured, the elliptical notch 191 may enhance the total internal reflection within the light guide 100 compared to the dual-V notch 181, 182 in FIG. 17.

It will be appreciated that variations of the above-disclosed embodiments and other features and functions, or alternatives thereof, may be desirably combined into many other different devices or applications. Also, various presently unforeseen or unanticipated alternatives, modifications, variations or improvements therein may be subsequently made by those skilled in the art which are also intended to be encompassed by the following claims.

What is claimed is:

1. A device, comprising:
   a light-transmissive element (LTE), wherein the LTE includes a notch with a curve or a notch made of a plurality of V-shaped notches;
   a source of illumination positioned inside the LTE, the source of illumination emits light;
   an aperture formed in the LTE, the aperture positioned to receive light emitted from the source of illumination;
   wherein the light emitted from the source of illumination goes through the aperture and illuminates a document, and
   wherein the LTE has a height of from about 20 mm to about 25 mm, and a width of from about 2 mm to about 6 mm.

2. The device according to claim 1, wherein the LTE has a refractive index $\eta_{LTE}$ of from about 1.4 to about 1.7.

3. The device according to claim 1, wherein the plurality of V-shaped notches includes a dual-V notch.

4. The device according to claim 1, wherein the source of illumination includes a light-emitting diode (LED).

5. The device according to claim 4, wherein the LED is a side emitting LED.

6. The device according to claim 1, wherein the LTE provides total internal reflection of light rays emitted from the source of illumination.

7. The device according to claim 1, wherein the aperture receives a portion of the light scattered from a diffusely reflecting scatterer.

8. The device according to claim 7, wherein the scatterer comprises one or more white painted surfaces or one or more grooves.

9. The device according to claim 1, the LTE including a cavity, the source of illumination positioned inside the cavity.

10. The device according to claim 9, wherein the cavity comprises a through-hole.

11. The device according to claim 9, wherein the cavity comprises a blind-hole.

12. The device according to claim 9, wherein the cavity is lined with one or more opaque reflective linings.

13. The device according to claim 1, the curve being a compound curve.

14. A device, comprising:
   a light-transmissive element (LTE), wherein the LTE includes a notch with a curve, and wherein the notch with a curve is an elliptical notch;
   a source of illumination positioned inside the LTE, the source of illumination emits light;
   an aperture formed in the LTE, the aperture positioned to receive light emitted from the source of illumination;
   wherein the light emitted from the source of illumination goes through the aperture and illuminates a document.

15. An apparatus, comprising:
   a light-transmissive element (LTE) including an aperture and a source of illumination contained within the LTE, wherein light emitted from the source of illumination is internally reflected to the aperture to illuminate a document, the LTE including a notch with a curve or a notch made of a plurality of V-shaped notches;

a lens adapted to receive a reflected image of the document and to focus the reflected image on to one or more sensors to convert the image to an electronic signal; and a storage device that records the electronic signal as digital data, and wherein the LTE has a height of from about 20 mm to about 25 mm, and a width of from about 2 mm to about 6 mm.

16. The apparatus according to claim 15, wherein the light-transmissive element has a length of from about 6 inches to about 36 inches.

17. The apparatus according to claim 15, further comprising a platen on which the document is positioned.

18. The apparatus according to claim 15, further comprising a document handler that guides the document.

19. The apparatus according to claim 15, wherein the sensors comprise charge coupled devices (CCDs).

20. The apparatus according to claim 15, wherein the source of illumination includes a light-emitted diode (LED).

21. The apparatus according to claim 15, wherein the sensors comprise a full-width array sensor.

22. The apparatus according to claim 15, wherein the plurality of V-shaped notches includes a dual-V notch.

23. The apparatus according to claim 15, the curve being a compound curve.

24. An apparatus, comprising:

a light-transmissive element (LTE) including an aperture and a source of illumination contained within the LTE, wherein light emitted from the source of illumination is internally reflected to the aperture to illuminate a document, the LTE including a notch with a curve, wherein the notch with a curve is an elliptical notch;

a lens adapted to receive a reflected image of the document and to focus the reflected image on to one or more sensors to convert the image to an electronic signal; and a storage device that records the electronic signal as digital data.

25. A xerographic marking device including the apparatus of claim 15.

26. A photocopier including the apparatus of claim 15.

27. A scanner including the apparatus of claim 15.

28. A device, comprising:

a light-transmissive element (LTE), wherein the LTE includes a dual-V notch having two sides, wherein each side of the notch includes a first and a second surface, wherein the first surface has a first degree of inclination with respect to the bottom of the LTE and the second surface has a second degree of inclination with respect to the bottom of the LTE, and wherein the first degree of inclination is different from the second degree of inclination;

a source of illumination positioned inside the LTE, the source of illumination emits light;

an aperture formed in the LTE, the aperture positioned to receive light emitted from the source of illumination;

wherein the light emitted from the source of illumination goes through the aperture and illuminates a document.

29. An apparatus, comprising:

a light-transmissive element (LTE) including an aperture and a source of illumination contained within the LTE, wherein light emitted from the source of illumination is internally reflected to the aperture to illuminate a document, the LTE including a notch with sides, wherein each side of the notch includes a first and a second surface, wherein the first surface has a first degree of inclination with respect to the bottom of the LTE and the second surface has a second degree of inclination with respect to the bottom of the LTE, and wherein the first degree of inclination is different from the second degree of inclination;

a lens adapted to receive a reflected image of the document and to focus the reflected image on to one or more sensors to convert the image to an electronic signal; and a storage device that records the electronic signal as digital data.

* * * * *